Patented Jan. 1, 1946

2,392,132

UNITED STATES PATENT OFFICE 2,392,132

PRODUCTION OF POLYMERIC COMPOUNDS

Henry Dreyfus, London, England; Claude Bonard administrator of said Henry Dreyfus, deceased No Drawing. Application November 21, 1942, Serial No. 466,478. In Great Britain January 23, 1939

11 Claims. (Cl. 260—2)

This invention is concerned with improvements in the production of highly polymeric compounds and of artificial filaments, films and other products therefrom, and is a continuation in part of my application S. No. 316,367 filed January 30, 1940.

In recent years a great deal of research has been directed to the production from simple organic compounds of polymeric compounds of high molecular weight having properties which render them suitable for the production of filaments, films, coating compositions and other articles for which naturally occurring substances, such as resins or cellulose, and semi-synthetic substances such as cellulose derivatives have previously been employed. Usually the polymers are obtained either by causing the union of a number of unsaturated molecules containing the ethylene linkage by intermolecular linkage at the double bonds, as in the case of polyvinyl compounds, or by a condensation process in which molecules containing two reactive radicles unite together with the elimination of water or other by-product. Polyamides are well-known examples of this type of polymer.

According to the present invention condensation polymers of high molecular weight suitable for the production of filaments, films, coating compositions and other articles are produced by heating a polymer-forming reaction mixture comprising an organic compound containing two reactive radicles of which one is the radicle of urea or a similar compound, e. g. N.N'-dimethylurea or N-methyl-thiourea, and has the formula $$-NR.CX.N\diagdown_{R_1}^{H}$$

where R and $R_1$ are each a hydrogen atom or a hydrocarbon radicle and X is an oxygen or sulphur atom and the other either has the same general formula or is an amino radicle. When a compound containing two radicles having the general formula

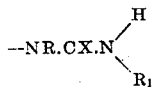

is employed, the two radicles may be the same or different. For instance, one may be a urea radicle and the other a thiourea radicle.

Various methods are available for the production of the di-ureas, amino-ureas and similar compounds which may be employed as starting materials. For instance, a di-urea may be produced by reacting two molecules of urea with one molecule of a dihalogenated paraffin, e. g. 1.6-dibromhexane, to give a straight chain compound having a urea radicle at each end or it may be produced by reacting one molecule of a diamine, e. g. 1.10-diamino-decane, with two molecules of carbamyl chloride. Amino-ureas may be produced in a similar manner by the use of appropriate proportions of the reagents. Similar methods may be employed for the production of the thiourea derivatives and similar derivatives employed in the present process.

Another method which may be employed successfully is based on the reaction between diamines and isocyanates and the like. For example, amino-ureas or di-ureas may be produced by reacting diamine hydrochlorides with appropriate proportions of metal isocyanates, while if metal isothiocyanates are employed thiourea derivatives may be produced. Compounds containing substituted urea or thiourea radicles may be produced in a similar manner using esters of isocyanates or isothiocyanates. For example, two mols of methyl or ethyl isocyanate or isothiocyanate may be reacted with one mol of a diamine to form the corresponding alkylated urea or thiourea. Production of a polymer may be carried out directly after formation of a di-urea or similar compound, without separation of the compound, by subjecting the reaction mixture, after the addition of further reagent if required, to polymer-forming conditions. Usually however, it is preferable to separate and purify the compound, particularly when it is produced from a metal isocyanate or isothiocyanate, on account of the by-product formed.

Production of the polymers according to the present invention may be effected by reacting a di-urea or similar compound with itself, with another compound of the same type or with a diamine, or by reacting an amino-urea with itself or with a similar compound. Linking up of individual molecules to give the macromolecules present in the polymers is thus the result of reaction between pairs of

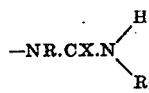

radicles or between

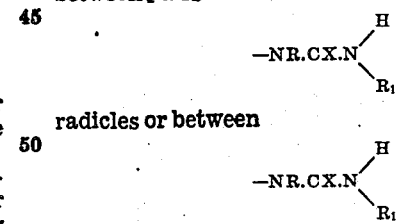

radicles and amino radicles. The first type of reaction probably results in the production of polymers containing biuret or similar residues and the second type of polymers containing urea or similar residues. Polymers containing both types of residues may be obtained, e. g. by using diamines and di-ureas or the like in other than equimolecular proportions.

When a reagent or reagents containing amino groups is employed the proportion of amino groups to urea groups or the like in the reaction mixture should not greatly exceed 1:1, since otherwise it may not be possible to obtain a polymer of an average molecular weight sufficiently high to give the desired properties by reason of all the urea groups or the like having been used up in the formation of low polymers having amino groups at each end. For instance, to take an extreme case, with two mols of a diamine to one mol of a di-urea the average composition of the product will be

which is not capable of further polymerisation On the other hand an excess of urea or similar groups over the 1:1 ratio is not objectionable, since these groups can react with each other to form bi-uret or similar residues.

The reagents employed should not be such that they are capable of reacting to form cyclic compounds containing less than eight atoms. particularly 4-7 atoms, in the ring. as if they are, such a reaction is liable to occur to the detriment of polymer formation. For example when an amino-urea or the like is employed the amino group and the radicle of urea or the like should be separated by a chain of at least five atoms.

The compounds employed in the present process are preferably aliphatic compounds, particularly ones in which the pairs of reactive radicles are linked by chains of methylene groups or are at least attached to methylene groups. Examples of suitable compounds have been given above. Others which may be employed are 1.3-diamino-propane, 1.4-diamino-butane and 1.5-diamino-pentane and the mono- and di-ureas and similar compounds which may be obtained from such diamines by the methods described above. The process is not however limited to the use of such compounds. For instance, aliphatic compounds may be employed in which the reactive radicles are linked by chains of atoms containing other atoms as well as carbon atoms. e. g. oxygen, sulphur or nitrogen atoms, or having alkyl or other non-reactive groups attached to the main chain. Aromatic compounds containing the reactive radicles may also be used. Examples of such compounds are 2.2'-diamino-diethyl ether, 2.2'-diamino-diethyl sulphide and bis(2-amino-ethyl) methylamine, di-amino-benzenes, alpha,alpha'-diamino-xylenes and the urea and similar derivatives obtainable therefrom.

As stated above, it is preferable to employ aliphatic compounds in which the reactive radicles are linked by methylene groups. Such compounds usually give polymers of higher melting points than those of polymers obtained from similar compounds containing other atoms in the chain between the reactive radicles or from aromatic compounds containing such radicles. Moreover, polymers obtained from compounds containing urea radicles usually have a higher melting point than those of compounds containing thiourea radicles. For the production of textile fibres, therefore, for which a high melting point is desirable, it is usually preferable to employ aliphatic compounds containing urea radicles linked by chains consisting of methylene groups.

Polymers may be obtained from reaction mixtures containing other polymer-forming reagents as well as those characteristic of the present invention. For instance, they may contain aminocarboxylic acids or dicarboxylic acids, which will yield polymers containing acid amide residues as well as bi-uret and/or urea residues or the like. Acid amide residues usually tend to increase the melting-point, which may be advantageous for the production of filament-forming polymers.

If polymers are produced which contain pairs of reactive radicles further polymerisation may occur if the polymers are subsequently heated to a high temperature, for instance during a melt-spinning process. To avoid this it may be desirable to have present in the reaction mixture a small proportion of a "stabilising agent" i. e. a compound which can react with one and only one of the reactive radicles. Such an agent may, for example, be a mono-alkyl halide or a secondary mono-amine.

The production of the polymeric compounds according to the process of the present invention is effected by heating the reactants at a suitable temperature, for example 150 to 250° C. or more, until a product having the desired properties is obtained. The reaction may be carried out under atmospheric pressure or the pressure may be reduced for example to 100, 50 or 5 mms. of mercury or the reaction may be carried out in a molecular still. A fairly high reaction temperature, for instance between 200 and 250° C., is usually desirable. It is desirable to remove relatively volatile by-products from the reaction medium as rapidly as possible and this may be assisted by passing an inert gas, for example nitrogen, through or over the reaction mixture. In any case it is advantageous to carry out the reaction in an inert atmosphere since in the presence of oxygen dark-coloured products may be obtained. The reaction may be carried out in a suitable inert liquid. e. g. phenol, a cresol or a xylenol, though better filament-forming products are usually obtained when the reaction is effected by heating the reagent or reagents alone in a molten state.

In order to obtain products having suitable properties for the formation of filaments, it is in general necessary to continue the reaction until the polymer has an average molecular weight of 6,000 to 8,000 or 10,000 or more. Polymers of lower average molecular weight, e. g. 3,000 or 4,000, though not usually suitable for the production of filaments, may be employed for the production of films, particularly coating films, and moulded products. in which high tenacity per unit of cross-section is of less importance. Preferably the reaction is stopped while the polymer is still soluble in suitable organic solvents, further polymerisation being effected. if desirable, after the polymer has been formed into filaments or other shaped articles.

The highly polymeric compounds of the present invention may be purified by washing them with suitable liquids or by dissolving them up and then precipitating them. They may be employed for the manufacture of shaped articles. For example, filaments, foils and similar articles may be produced by extruding a solution of a highly polymeric compound through a shaping device into a gaseous or liquid setting medium or by extruding a plastic or molten mass of the polymeric substance through a shaping device and taking it up on a roller or other forwarding device. Filaments, films and similar products may be stretched, either continuously with their production or subsequently thereto e. g. when they are in a softened condition under the influence of heat or of a suitable solvent.

The following examples illustrate the invention:

Example I 16 parts of hexamethylene diamine hydrochloride were dissolved in about 20 parts of water and the solution diluted to about 3 times its volume with methyl alcohol. A concentrated aqueous solution containing 13.7 parts of potassium cyanate was then added and the potassium chloride which separated out was filtered off. The filtrate was concentrated by evaporation and the precipitate of di-urea which separated on cooling was well washed with cold water to remove soluble chlorides and then re-crystallised from hot water, after which it was dried.

The di-urea was then heated at a temperature of 235–240° C. in the absence of oxygen in an autoclave through which a current of nitrogen was passed. Ammonia was evolved and the melt which was formed gradually increased in viscosity. After about two hours a solid product was obtained melting at 245–250° C. and having fibre-forming properties.

Example II 3.4 parts of methyl isocyanate were dissolved in about 16 parts of methyl alcohol and poured gradually, with continuous stirring, into about 20 parts of an alcoholic solution of 3.5 parts of hexamethylene diamine. The solution obtained was heated to about 60° C. and then poured into an excess of cold water. The N.N'-dimethyl-di-urea was precipitated as a white crystalline solid which was filtered off, washed several times with cold water, then with acetone and finally dried.

2.3 parts of the di(methylurea) were heated at about 200° C. with 1.2 parts of hexamethylene diamine in 20 parts of medium paraffin oil in the absence of oxygen in an autoclave through which a current of nitrogen was passed. Ammonia was evolved and after about two hours a product having fibre-forming properties was obtained. It had a melting point of about 255° C.

Example III 5.05 parts of hexamethylene di-urea (obtained as described in Example I) was thoroughly mixed with 1.8 parts of hexamethylene diamine (i. e. in a molecular ratio of 5 to 3) and the mixture was heated at 200 to 210° C. in the absence of oxygen in an autoclave through which a current of nitrogen was passed. After about 15 to 30 minutes a product having a melting point of 245–250° C. and having fibre-forming properties was obtained.

Example IV 18.9 parts of hexamethylene di-ammonium hydrochloride and 20 parts of potassium thiocyanate were each dissolved in methyl alcohol and the solutions mixed with constant stirring. The mixture was heated to about 60° C. and the potassium chloride which separated was filtered off. The filtrate was evaporated until a precipitate of the di-thiourea was obtained and the precipitate was then filtered off, washed with ether and dried.

19.2 parts of the di-thiourea were heated with 9.6 parts of hexamethylene diamine at about 200° C. in the absence of oxygen in an autoclave through which a current of nitrogen was passed. Ammonia was evolved and after about 30 minutes to one hour a product having some fibre-forming properties was obtained. They were not however so good as those of the urea polymers obtained as described in Examples I and III.

Example V

A fibre-forming polymer obtained as described in Example III was extruded through a jet having a diameter of .5 mm. under a nitrogen pressure of 10 lbs./sq. in. and at a temperature of 260° C. The extruded filament was drawn down between two rollers, the second of which had a peripheral speed twice that of the first, and was then taken up on a bobbin.

Having described my invention what I desire to secure by Letters Patent is:

1. Process for the production of linear polymers of high molecular weight, which comprises heating, until a polymer having film-forming properties is obtained, a reaction mass wherein the sole polymer-forming molecules present are molecules containing only two reactive radicles linked by divalent organic radicles containing at least 3 and not more than 10 chain atoms, the said reactive radicles being selected from the group consisting of urea, thiourea and of primary and secondary amino radicles with urea and thiourea, and any excess in the number of amino radicles over the number of other reactive radicles present being at most only slight.

2. Process for the production of linear polymers of high molecular weight, which comprises heating a reaction mass wherein the sole polymer-forming molecules present are molecules having the formula:

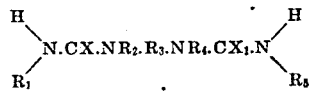

where $R_1$, $R_2$, $R_4$ and $R_5$ is each selected from the class consisting of hydrogen atom and hydrocarbon radicles, $R_3$ is a divalent radicle consisting of a chain containing at least 3 and not more than 10 chain atoms linking the nitrogen-containing radicles and $X$ and $X_1$ is each selected from the class consisting of oxygen and sulphur atoms, heating being effected at a temperature of 200 to 250° C. for at least part of the reaction and continued until a product having filament-forming properties is obtained.

3. Process for the production of linear polymers of high molecular weight, which comprises heating a reaction mass wherein the sole polymer-forming molecules present are molecules having the formula:

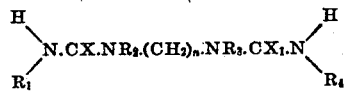

where $R_1$, $R_2$, $R_3$ and $R_4$ is each selected from the class consisting of hydrogen atom and hydrocarbon radicles, $n$ is an integer greater than 2 and smaller than 11 and $X$ and $X_1$ is each selected from the class consisting of oxygen and sulphur atoms, heating being effected at a temperature of 200 to 250° C. for at least part of the reaction and continued until a product having filament-forming properties is obtained.

4. Process for the production of linear polymers of high molecular weight, which comprises heating a reaction mass containing hexamethylene diurea as sole polymer-forming reagent, heating being effected at a temperature of 200 to 250° C. for at least part of the reaction period and continued until a product having filament-forming properties is obtained.

5. Process for the production of linear polymers of high molecular weight, which comprises heating a reaction mass containing as sole polymer-forming reagents a diamine in which each of the amino radicles contains at least one hydrogen atom directly attached to the nitrogen atom said amino radicles being the sole reactive radicles present in the diamine, and an organic compound having the formula

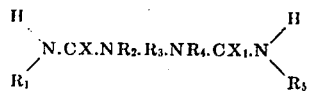

where $R_1$, $R_2$, $R_4$ and $R_5$ is each selected from the class consisting of hydrogen atom and hydrocarbon radicles, $R_3$ is a chain of at least three and not more than ten chain atoms linking the nitrogen-containing radicles and free from reactive radicles and X and $X_1$ is each selected from the class consisting of oxygen and sulphur atoms, the amounts of the two compounds being such that the mass contains at most only a slight stoichiometric excess of amino groups over the other reactive groups, heating being effected at a temperature of 200 to 250° C. for at least part of the reaction period and continued until a product having filament-forming properties is obtained.

6. Process for the production of linear polymers of high molecular weight, which comprises heating a reaction mass containing as sole polymer-forming reagents a diamine in which each of the amino radicles contains at least one hydrogen atom directly attached to the nitrogen atom said amino radicles being the sole reactive radicles present in the diamine, and an organic compound having the formula

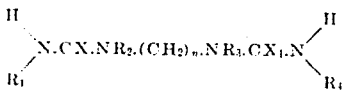

where $R_1$, $R_2$, $R_3$ and $R_4$ is each selected from the class consisting of hydrogen atom and hydrocarbon radicles, $n$ is an integer greater than 2 and smaller than 11 and X and $X_1$ is each selected from the class consisting of oxygen and sulphur atoms, the amounts of the two compounds being such that the mass contains at most only a slight stoichiometric excess of amino groups over the other reactive groups, heating being effected at a temperature of 200 to 250° C. for at least part of the reaction period and continued until a product having filament-forming properties is obtained.

7. Process for the production of linear polymers of high molecular weight, which comprises heating a reaction mass containing as sole polymer-forming reagents hexamethylene diamine and hexamethylene diurea, the molecular ratio of diurea to diamine being at least 1:1, heating being effected at a temperature of 200 to 250° C. for at least part of the reaction period and continued until a product having filament-forming properties is obtained.

8. Process for the production of linear polymers of high molecular weight, which comprises heating a reaction mass wherein the sole polymer-forming molecules present are molecules having the formula:

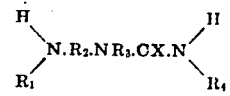

where $R_1$, $R_3$ and $R_4$ is each selected from the class consisting of hydrogen atom and hydrocarbon radicles, $R_2$ is a divalent radicle consisting of a chain of at least 5 and not more than 10 chain atoms linking the two nitrogen-containing radicles and X is selected from the class consisting of oxygen and sulphur atoms, heating being continued until a product having film-forming properties is obtained.

9. Process for the production of linear polymers of high molecular weight, which comprises heating a reaction mass wherein the sole polymer-forming molecules present are molecules having the formula:

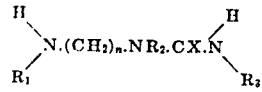

where $R_1$, $R_2$ and $R_3$ is each selected from the class consisting of hydrogen atom and hydrocarbon radicles, $n$ is an integer greater than 4 and smaller than 11 and X is selected from the class consisting of oxygen and sulphur atoms, heating being effected at a temperature of 200 to 250° C. for at least part of the reaction period and continued until a product having filament-forming properties is obtained.

10. Linear polymers having film-forming properties and consisting substantially of units containing the group —$NR_1.CX.NR_2.CX_1.NR_3$—, where $R_1$, $R_2$ and $R_3$ is each selected from the class consisting of hydrogen atom and hydrocarbon radicles, and X and $X_1$ is each selected from the class consisting of oxygen and sulphur atoms.

11. Artificial filaments, foils and the like comprising a linear polymer having film-forming properties and consisting substantially of units containing the group —$NR_1.CX.NR_2.CX_1.NR_3$—, where $R_1$, $R_2$ and $R_3$ is each selected from the class consisting of hydrogen atom and hydrocarbon radicles, and X and $X_1$ is each selected from the class consisting of oxygen and sulphur atoms.

HENRY DREYFUS.